United States Patent
Ovuthitham

(10) Patent No.: US 6,831,026 B2
(45) Date of Patent: Dec. 14, 2004

(54) ESSENTIALLY LEAD FREE GLASS AND A GLASS TUBE MADE THEREFROM

(75) Inventor: Somchai Ovuthitham, Samutprakarn (TH)

(73) Assignee: L. Electric Glass Co. Ltd., Samutpakarn (TH)

(*) Notice: Subject to any disclaimer, the term of this patent is extended or adjusted under 35 U.S.C. 154(b) by 196 days.

(21) Appl. No.: 10/340,213

(22) Filed: Jan. 10, 2003

(65) Prior Publication Data

US 2003/0166447 A1 Sep. 4, 2003

(30) Foreign Application Priority Data

Jan. 10, 2002 (TH) ................................................ 071094

(51) Int. Cl.$^7$ .......................... H01K 1/28; C03C 3/00; C03C 3/091
(52) U.S. Cl. ............................ 501/11; 501/53; 501/66; 313/636; 220/2.1 R
(58) Field of Search ............................ 501/11, 53, 66; 313/636; 220/2.1 R

(56) References Cited

U.S. PATENT DOCUMENTS

| | | | | |
|---|---|---|---|---|
| 3,148,300 A | * | 9/1964 | Graff ........................... | 313/112 |
| 5,747,398 A | * | 5/1998 | Higby et al. ................... | 501/66 |
| 5,885,915 A | * | 3/1999 | Bako et al. .................... | 501/66 |
| 6,528,444 B1 | * | 3/2003 | Kondoh et al. ................ | 501/70 |

OTHER PUBLICATIONS

Composition and Properties of L–29F; Nippon Electric Glass Co., Ltd. (no date provided).

* cited by examiner

*Primary Examiner*—David Brunsman
(74) *Attorney, Agent, or Firm*—Baker & McKenzie LLP

(57) ABSTRACT

The invention relates to an essentially lead free glass. The lead free glass is suitable for making glass tubes and glass tubes for electric lamps in particular. The essentially lead free glass is characterized by having the lead oxide of a lead glass replaced by 1.0–3.0% by weight of lithium oxide. The ultraviolet radiation absorption of the glass is improved for wavelengths shorter than 320 nm. by the presence of 0.1–0.3% by weight of cerium oxide ($CeO_2$) and 0.05–0.15% by weight of titanium dioxide ($TiO_2$). With such an essentially lead free glass the transmittance of visible radiation may also be improved.

12 Claims, 3 Drawing Sheets

ESSENTIALLY LEAD FREE GLASS AND A GLASS TUBE MADE THEREFROM

FIELD OF THE INVENTION

This invention relates to an essentially lead free glass. The invention also relates to a glass tube made from the essentially lead free glass. The lead free glass has properties making it particularly suitable for use in tubes of electric lamps. Therefore the glass may be used in the manufacture of light bulbs.

BACKGROUND OF THE INVENTION

Nowadays glass tubes used in the manufacture of electric lamps are usually made from either a soda-lime glass or a lead glass. The lead glass contains lead oxide. Both lead oxide dust and lead vapor from melting lead oxide can cause dangerous air pollution harmful to the environment and to human beings.

Lead oxide acts as a fluxing agent and gives lead glass a lower softening poet than soda-lime glass. It is desirable for glass that is used in making tubes for electric lamps to have this lower song point but without containing lead oxide, For making such a glass suitable for use in electric lamp production, we have substituted lithium carbonate for the lead oxide. Lithium carbonate is also a fluxing agent. Because of this it allows an increase in the melting rate of the glass by lowering its viscosity. It also leads to a lower seed (bubble) count, a lower thermal expansion coefficient and a higher chemical durability of the glass as well.

We have also found that when cerium oxide and titanium dioxide are mixed with the essentially lead free glass, a glass may be made that is capable of absorbing substantially all ultraviolet (UV) radiation having a wavelength shorter than 320 nm.

It has been known that cerium oxide may be used as a decolouriser and a refining agent. It also acts as a flux in glass making and helps clear gas by reducing seeding and bubble formation in molten glass. In addition, the use of cerium oxide has also been reported to increase the life expectancy of the melting electrodes used in electric furnaces.

Cerium oxide may have its performance complemented by the addition of sodium nitrate, which causes a chemical reaction with the cerium oxide.

The presence of cerium oxide, with or without the addition of sodium nitrate, does not increase the absorption of the visible spectrum of light and light transmittance at wavelengths greater than 320 nm. is particularly satisfactory for the manufacture of electric lamps.

SUMMARY OF THE INVENTION

An object of at least one preferred embodiment of the present invention is the provision of an essentially lead free glass suitable for the manufacture of tubes for electric lamps.

Another object of at least a preferred embodiment of the invention is such an essentially lead free glass tube. This is achieved by replacing the potentially harms lead oxide present in lead glass.

Another object of at least a preferred embodiment of the invention is to provide an essentially lead free glass that absorbs substantially all UV radiation having a wavelength shorter than 320 nm. while, preferably, increasing the efficiency of transmission of visible light. These features are also desirable in glass tubes used in the manufacture of electric lamps.

In a first aspect, the present invention broadly consists in an essentially lead free glass comprising:

| Compound | Percentage |
|---|---|
| $Li_2O$ | 1.0–3.0 |
| $CeO_2$ | 0.1–0.3 |
| $TiO_2$ | 0.05–0.15 |

The lead free glass will typically comprise 65.0–75.0% $SiO_2$. It may contain one or more, and preferably contains all of the following: 2.0–4.0% $Al_2O_3$, 1.0–3.0% $B_2O_3$, 3.0–5.0% BaO, a total of 6.0–9.0% MgO and/or CaO, 6.0–9.0% $Na_2O$, 3.0–5.0% $K_2O$, 1.0–3.0% $Li_2O$, 0.1–0.3% $CeO_2$, optionally about 0.01% $Fe_2O_3$ and 0.05–0.15% $TiO_2$.

In a second aspect, the present invention broadly consists in a glass tube made from an essentially lead free glass as defined above.

In a third aspect, the present invention broadly consists in an electric lamp having its tube (which term includes "bulb") made from the essentially lead fee glass as defined above.

In the specification, unless otherwise stated, percentages are by weight,

DESCRIPTION OF THE INVENTION

Figure 1:
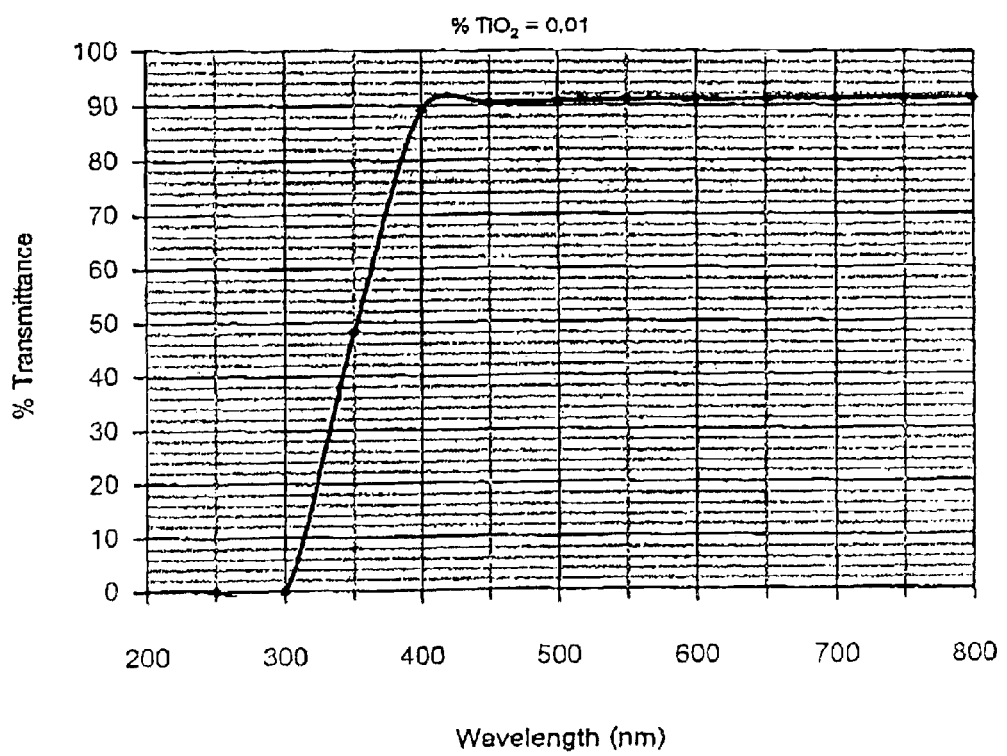
FIG. 1 is a graph showing light transmittance at various wave lengths for an essentially lead free glass containing 0.01% titanium dioxide ($TiO_2$).

The present invention has resulted from a case study made by the Inventor with the intention of finding a substitute substance for the lead oxide contained in lead glass while, in general, retaining as much as possible the desirable properties of lead glass. At the same time, the Inventor desired to improve, if possible, the absorbance of the glass to UV radiation that is harmful to the eyes of human beings.

The Inventor worked in the production of glass tubing made from soda-lime and lad glass. The Inventor discovered that the proportion of soda ash and potassium carbonate, which respectively form sodium oxide ($Na_2O$) and potassium oxide ($K_2O$) in the glass, was the main factor affecting the coefficient of expansion or alpha ($\alpha$) value of the glass. Therefore, for the essentially lead fee glass of the present invention it was desired to have the alpha value close to that of lead glass. For a glass having a sodium oxide ($Na_2O$) content of 7.5–9.5% and a potassium oxide ($K_3O$) content of 3.5–5.0%, an alpha value range of about $(93.0–95.0) \times 10^{-7}/°C$. was obtained. The extent of the thermal expansion of glass is related to its tempt durability. This is relevant for the use of glass for the tubes of electric lamps.

It was also necessary to consider the softening point of the glass as well because this is one of the most important properties of glass. For lead glass containing litharge to provide the lead oxide (PbO) contest, the softening point of the glass is lower than that of soda-lime glass. The Inventor found that the softening point of soda-lime glass was generally in the range 690–700° C., whereas the softening point of lead glass was generally in the range of 610–620° C.

Therefore, instead of the litharge we used a lithium oxide forming substance. In particular, we used 1.5% of lithium carbonate ($Li_2CO_3$), which formed lithium oxide ($Li_2O$) in the mix with the other raw materials for making a glass having a softening point higher that that of lead glass but not greater than that of soda-line glass.

In addition, we mixed 0.20–0.25% of cerium oxide ($CeO_2$) aid titanium dioxide ($TiO_2$) into the glass mixture to produce a glass having an improved light transmittance; by that moaning a better absorbance at wave length shot than 320 nm. with at least normal and preferably improved transmittance of visible light. Normally, titanium dioxide ($TIO_2$) was an impurity in the mixture and, depending on the degree it already existed in the mixture as an impurity, only 0–0.01% was required to be added to the mixture.

The following describe some examples of the invention. They are given only by way of demonstrating the working of the invention and are not intended to limit the scope of the invention as broadly claimed.

EXAMPLE 1

The raw material mix for the essentially lead free glass was as follows:

| Compound | Percentage |
| --- | --- |
| $SiO_2$ | 68.67 |
| $Al_2O_3$ | 3.00 |
| $B_2O_3$ | 2.00 |
| BaO | 4.00 |
| MgO / CaO | 8.00 |
| $Na_2O_3$ | 7.60 |
| $K_2O$ | 5.00 |
| $Li_2O$ | 1.50 |
| $CeO_2$ | 0.20 |
| $Fe_2O_3$ | 0.02 |
| $TiO_2$ | 0.01 |

To obtain these percentages of the compounds, we calculated the raw materials used in the molting glass method to be as follows:

| Sand | 68.85 |
| --- | --- |
| Soda ash dense | 10.80 |
| Alumina | 2.97 |
| Potassium Carbonate | 7.36 |
| Dolomite | 15.18 |
| Barium Carbonate | 5.24 |
| Lithium Carbonate | 3.73 |
| Sodium Nitrate | 1.00 |
| Cerium Oxide | 0.20 |
| Borax Pentahydrate | 4.12 |

After ensuring that the glass was essentially lead free, we checked its physical properties and found that it had an alpha ($\alpha$) value of $92.0\times10^{-7}/°$ C. and a softening point of 690° C. For this example, the alpha value was lower than that for lead glass but the softening point was higher than that for lead glass but close to that for soda-lime glass. Therefore, we adjusted the chemical balance to reduce the softening point by changing the amount of lithium oxide from 1.50°/e to 2.70% in the following example.

EXAMPLE 2

| Compound | Percentage |
| --- | --- |
| $SiO_2$ | 68.78 |
| $Al_2O_3$ | 3.00 |
| $B_2O_3$ | 2.00 |
| BaO | 4.00 |
| MgO / CaO | 7.80 |
| $Na_2O$ | 7.30 |
| $K_2O$ | 4.00 |
| $Li_2O$ | 2.70 |
| $CeO_2$ | 0.20 |
| $Fe_2O$ | 0.01 |
| $TiO_2$ | 0.01 |

To obtain these percentages of the chemical compounds, we calculated the proportions of the materials recd before performing the melting glass method as follows:

| Sand | 69.00 |
| --- | --- |
| Soda ash dense | 10.31 |
| Alumina | 2.98 |
| Potassium Carbonate | 5.88 |
| Dolomite | 15.19 |
| Barium Carbonate | 5.24 |
| Lithium Carbonate | 6.73 |
| Sodium Nitrate | 1.00 |
| Cerium Oxide | 0.20 |
| Borax Pentahydrate | 4.12 |

After ensuring the glass was essentially lead free, we investigated its physical properties and found its alpha ($\alpha$) value to be $95.4\times10^{-7}/°$ C. and its softening point value to be 656° C.

For the Example 2, the alpha value was higher and the softening point was lower than that of Example 1. We proceeded to investigate the transmittance properties of Example 2. The result found was that the percentage transmittance of UV radiation was substantially zero for wavelength less than 320 nm. but rose for longer wavelengths. At the wavelengths becoming visible to human eyes, the percentage transmittance increased to about 48.29% (FIG. 1).

Figure 2:
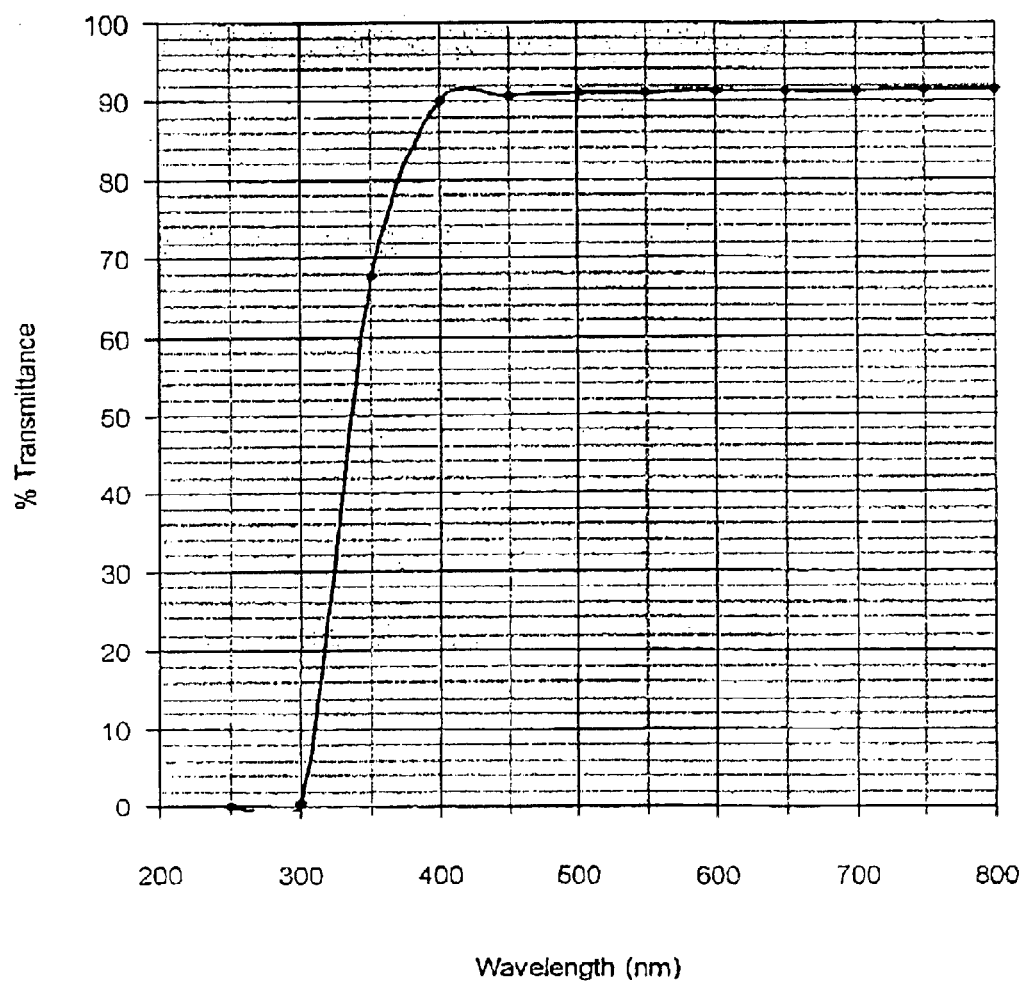
FIG. 2 is a graph showing light transmittance at various wave lengths for an essentially lead free glass containing 0.10% titanium dioxide ($TiO_2$).

Therefore, to encourage the highest utility in the industrial production industry, we added to the essentially lead free glass 0.10% of titanium dioxide ($TiO_2$). We found that this increased a percentage transmittance of the visible light at a wavelength of 350 nm., that transmittance being 67.64% (FIG. 2).

From this, the Inventor concluded that for at least one preferred embodiment of the invention the most suitable chemical proportions to be us in the production of essentially lead free glass am as follows:

| Compound | Percentage |
| --- | --- |
| $SiO_2$ | 68.89 |
| $Al_2O_3$ | 3.00 |
| $B_2O_3$ | 2.00 |
| BaO | 4.00 |
| MgO / CaO | 7.80 |

-continued

| Compound | Percentage |
|---|---|
| Na$_2$O | 7.80 |
| K$_2$O | 4.00 |
| Li$_2$O | 2.20 |
| CeO$_2$ | 0.20 |
| Fe$_2$O$_3$ | (0.01) |
| TiO$_2$ | 0.10 |

In the above table the percentage of Fe$_2$O$_3$ represented the level of the impurity contained in the raw materials. By removing essentially all Fe$_2$O$_3$ it was found to have no significant effect on any property of the essentially lead free glass.

The physical properties of this glass were investigated and it was found to have an alpha ($\alpha$) value of $(94.5\pm0.5)\times10^{-7}/°$C. and a softening point of 660±5° C.

Figure 3:
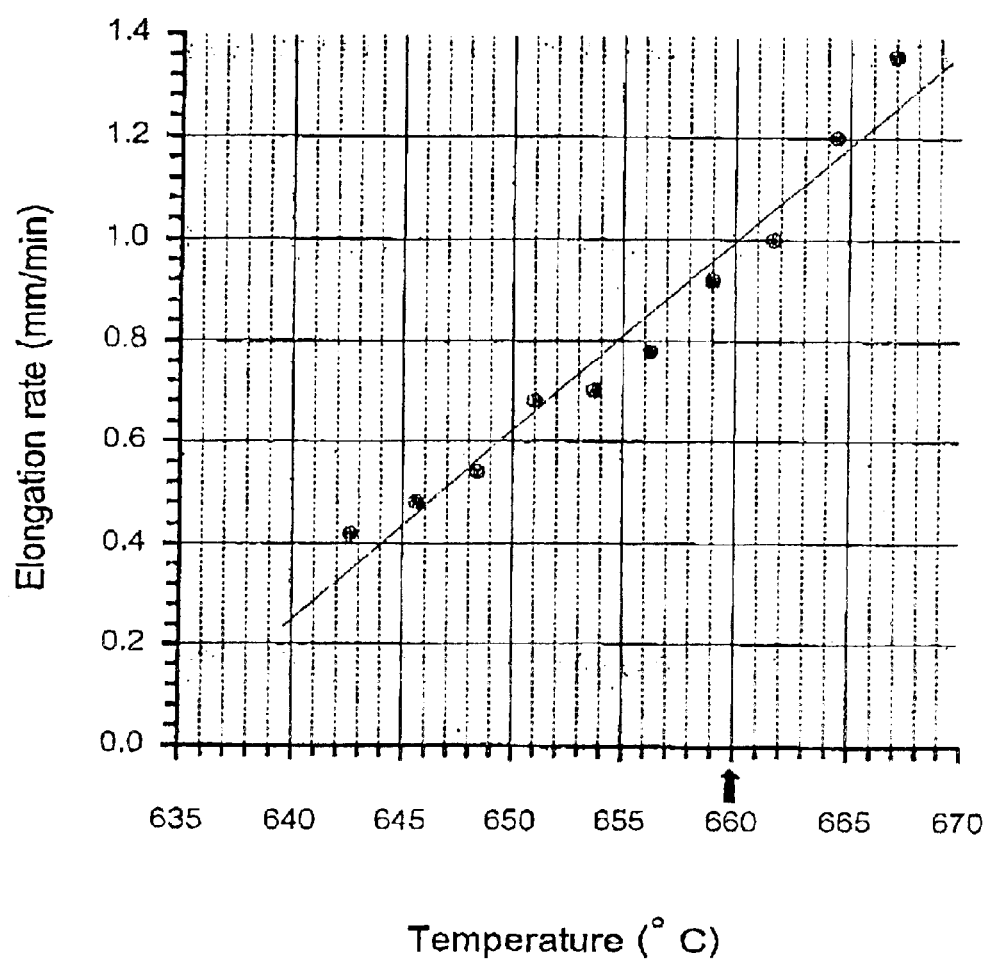
FIG. 3 is a graph of flexibility or softening point showing the elongation rate per minute at various temperatures.

FIG. 3 is a graph showing the elongation rate of glass per minute plotted against the temperature and enables the softening point value of the glass to be determined. For an elongation rate of 1.0 nm./minute the softening point is sown to be 660° C.

From an examination of other properties of the essentially lead free glass, we determined its density to be 2.54±0.01 gm/cc. This density value is between the density values of soda-lime and lead glasses.

We have intentionally described the easiest empirical experiments in the above examples. As already stated, these examples are intended to be illustrative of the invention only and are not intended to limit the scope of the invention claimed.

What is claimed is:

1. An essentially lead free glass comprising:

| Compound | Percentage |
|---|---|
| Li$_2$O | 1.0–3.0 |
| CeO$_2$ | 0.1–0.3 |
| TiO$_2$ | 0.05–0.15. |

2. An essentially lead free glass comprising:

| Compound | Percentage |
|---|---|
| SiO$_2$ | 65.0–75.0 |
| Al$_2$O$_3$ | 2.0–4.0 |
| B$_2$O$_3$ | 1.0–3.0 |
| BaO | 3.0–5.0 |
| MgO } CaO } | 6.0–9.0 |
| Na$_2$O | 6.0–9.0 |
| K$_2$O | 3.0–5.0 |
| Li$_2$O | 1.0–3.0 |
| CeO$_2$ | 0.1–0.3 |
| Fe$_2$O$_3$ | (0.01) optional |
| TiO$_2$ | 0.05–0.15. |

3. An essentially lead free glass according to claim 1 wherein the glass has a softening point between the softening points of soda-lime glass and lead glass.

4. An essentially lead free glass according to claim 1 wherein the glass has a UV transmittance of essentially zero for wavelengths shorter than 320 nm.

5. An essentially lead-free glass according to claim 1 wherein the glass has an improved transmittance of light at a wavelength of 350 nm. relative to a glass essentially free of cerium oxide and titanium dioxide.

6. A tube made from the essentially lead free glass as claimed in any one of the preceding claims 1–5.

7. An electric lamp having a tube made from the essentially lead free glass as claimed in any one of claims 1–5.

8. An essentially load free glass according to claim 2 wherein the glass has a softening point between the softening points of soda-lime glass and lead glass.

9. An essentially lead fee glass according to claim 2 wherein the glass has a UV transmittance of essentially zero foe wavelengths shorter than 320 nm.

10. An essentially lead free glass according to claim 2 wherein the glass has an improved transmittance of light at a wavelengths of 350 nm relative to a glass essentially free of cerium oxide and titanium dioxide.

11. A tube made from the essentially lead free glass as claimed in any one of claims 2 and 8–10.

12. An electric lamp having a tube made from the essentially lead free glass as claimed in any one of claims 2 and 8–10.

* * * * *

UNITED STATES PATENT AND TRADEMARK OFFICE
CERTIFICATE OF CORRECTION

PATENT NO.     : 6,831,026 B2
DATED          : December 14, 2004
INVENTOR(S)    : Ovuthitham It is certified that error appears in the above-identified patent and that said Letters Patent is hereby corrected as shown below:

<u>Title page,</u>
Item [75], Inventor, should read -- Somchai Ovuthitham, Samutsakorn (TH) --.
Item [73], Assignee, should read -- L. Electric Glass Co. Ltd., Samutsakorn (TH) --.

Signed and Sealed this

Twenty-second Day of November, 2005

JON W. DUDAS
*Director of the United States Patent and Trademark Office*